July 30, 1929.                G. L. FISHER                1,722,284
                          INCASED ELECTRIC MOTOR
                           Filed Oct. 19, 1925

Inventor
Grover Leo Fisher
By
Attorney

Patented July 30, 1929.

1,722,284

UNITED STATES PATENT OFFICE.

GROVER LEO FISHER, OF SANDUSKY, OHIO, ASSIGNOR OF ONE-HALF TO CARL L. OSBERG, OF DETROIT, MICHIGAN.

INCASED ELECTRIC MOTOR.

Application filed October 19, 1925. Serial No. 63,427.

In the art of refrigeration, compressors have been driven by electric motors and from other sources of power. Various kinds of stuffing boxes, glands and packing have been designed to eliminate the leakage of gas from a compressor about the drive shaft thereof, and to obviate the necessity of using stuffing boxes and the like, I have devised an incased electric motor that may be mounted on a compressor or connected thereto so that if there is any leakage of gas the gas will escape into the casing of the motor and cannot escape therefrom.

My invention also aims to provide an electric motor having an air tight casing of novel design provided with pole pieces that are supported between the field and the commutator of the motor. The principle involved is applicable to direct and alternating current motors, and while my casing has been especially designed for a motor, it might be enlarged or designed for enclosing any other source of power adapted for driving a compressor.

My invention will be hereinafter specifically designed and then claimed, and reference will now be had to the drawing, wherein—

Figure 1:
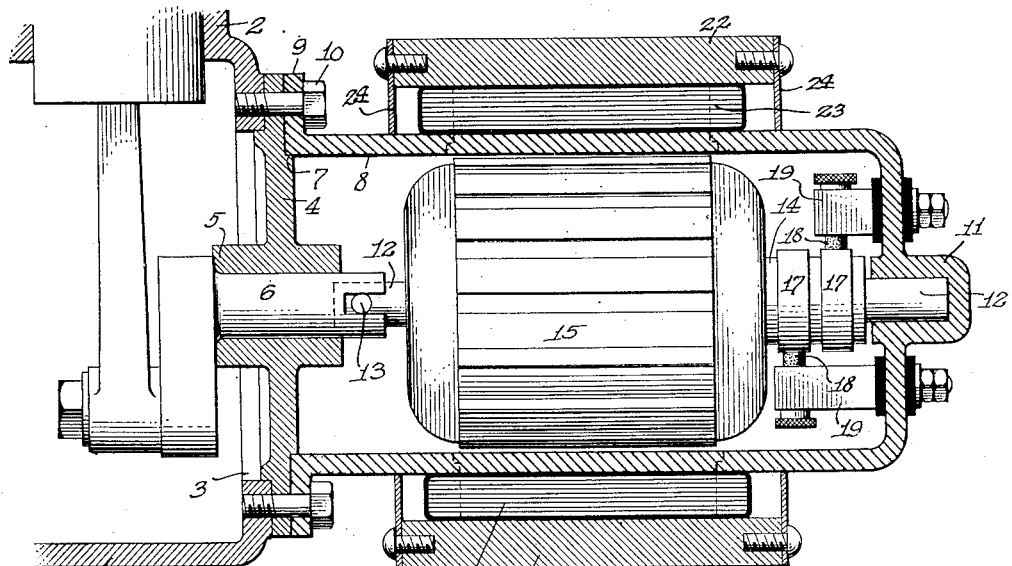
Figure 1 is a longitudinal sectional view of the incased motor.
Figure 2:
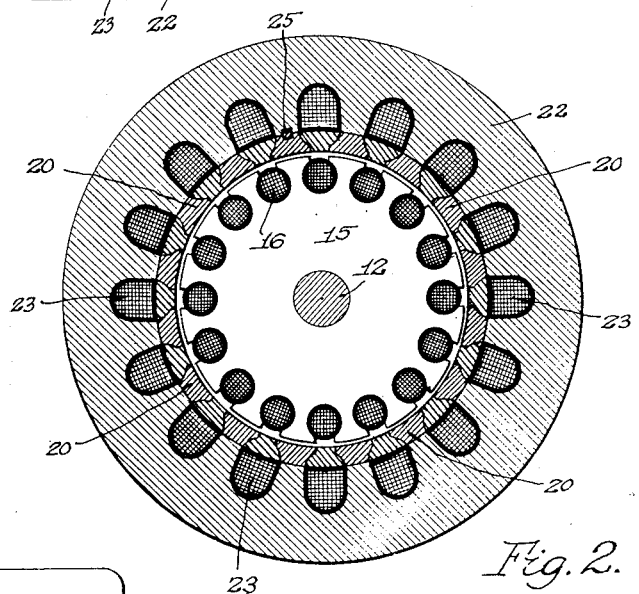
Fig. 2 is a cross sectional view of the same.

In the drawing, the reference numeral 1 denotes the crank case of a conventional form of compressor 2, and an end wall of the crank case 1 has an opening 3 normally closed by an end plate 4 having a bearing 5 for the crank shaft 6 of the compressor.

The end plate 4 has been shown as provided with an annular seat 7 for the inner flanged end of a casing 8, said casing having its end flange 9 secured to the end plate 4 by screw bolts 10 or other fastening means which also holds the end plate 4 in engagement with the crank case 1.

The casing 8 is made of non-magnetic material, for instance brass, and the outer end of said casing has a closed bearing 11 longitudinally aligning with the bearing 5, so that an armature shaft 12 may be journaled in the bearing 11 and coupled, as at 13, to the crank shaft 6 of the compressor 2.

On the armature shaft 12 is a hub portion 14 of an armature body 15 provided with insulated windings 16 which are spaced about the periphery of the armature body. The hub 14 supports the usual contact or commutator rings 17 for brushes 18, said brushes being carried by brush holders 19 insulated from and suitably connected to the end wall of the casing 8, adjacent the bearing 11.

Figure 3:
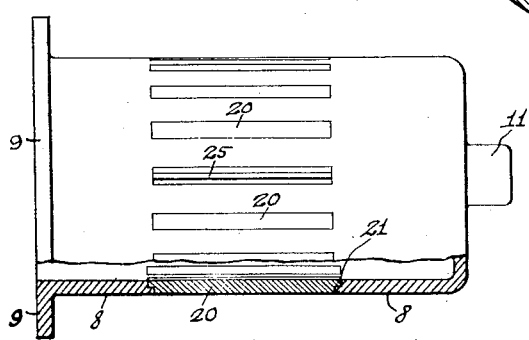
Fig. 3 is a plan of the casing partly broken away and partly in section.

The non-magnetic casing 8 is provided with inserts 20 of magnetic material, these inserts being best shown in Figure 3 as being insertable in the casing from the interior thereof, so that end lips 21 of the inserts 20 and the cross sectional shape of said inserts will prevent outward displacement thereof. In other words, the magnetic inserts are imbedded or seated in the casing just as though integral therewith, and these magnetic inserts correspond in number and length to the armature windings.

In this instance, the armature 15 serves as a rotor, the casing 8 as a stator, and mounted on the stator is a field frame 22 containing coils 23 which may be conveniently placed in position by virtue of detachable end plates 24 carried by the field structure. To prevent rotation of the field relative to the casing 8, said casing may be keyed or otherwise fixed thereto, as at 25.

When the armature becomes the stator it is obvious that the field becomes the rotor. In either instance there is no gas outlet connection between the rotor and stator and any gas entering the casing 8 from the compressor cannot escape into the atmosphere. This will overcome the defect of many refrigeratory plants, especially of the household type, in which the escape of ammonia gas is objectionable.

One embodiment of my invention has been illustrated, but it is to be understood that the structural elements are susceptible to such variations and modifications as fall within the scope of the appended claims.

What I claim is:—

1. A motor of the type described, comprising a completely closed non-magnetic casing, a driven armature in said casing, a field structure supported outside said casing, and magnetic inserts in said casing between said armature and said field structure.

2. In a motor having an armature and field, a sealed non-magnetic casing for the armature and interposed between said armature and said field, said casing being made of non-magnetic material, and spaced magnetic inserts set in said casing in parallel relation to the longitudinal axis of the casing.

3. An enclosure for an armature comprising a cylinder, sections imbedded in the wall thereof and of a material different in magnetic qualities from the material of the cylinder.

In testimony whereof I affix my signature.

GROVER LEO FISHER.